United States Patent Office 3,422,118
Patented Jan. 14, 1969

3,422,118
CYANOALKYLATED CYCLIC CARBONATES
Fritz Hostettler and Eugene F. Cox, Charleston, W. Va., assignors to Union Carbide Corporation, a corporation of New York
No Drawing. Filed Nov. 20, 1963, Ser. No. 325,140
U.S. Cl. 260—340.2                8 Claims
Int. Cl. C07d *13/06;* C08g *17/13*

This invention relates to the preparation of cyanoalkylated carbonate compounds. In various aspects, the invention relates to processes for producing said cyanoalkylated carbonate compounds.

The novel cyanoalkylated carbonate compounds which are contemplated can be characterized by the following Formula I

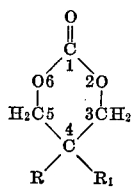

wherein R can be hydrocarbyl, e.g., alkyl cycloalkyl, aryl, alkaryl, aralkyl, alkenyl, cycloalkenyl, and the like; hydrocarbyloxymethyl, e.g., alkoxymethyl, alkenyloxymethyl, cycloalkoxymethyl, aryloxymethyl, cycloalkenyloxymethyl, aralkoxymethyl, and the like; acyloxymethyl, e.g., alkanoyloxymethyl, alkenoyloxymethyl, alkadienoyloxymethyl, alkatrienoyloxymethyl, arylcarbonyloxymethyl, and the like; nitro (—$NO_2$); 2-cyanoethoxymethyl; 2-cyano-1-alkylethoxymethyl; and the unit

each R' being 2-cyanoethyl, 2-cyano-1-alkylethyl, or hydrocarbyl, i.e., a monovalent hydrocarbon radical such as alkyl, alkenyl, cycloalkyl, aralkyl, cycloalkenyl, and the like; and wherein $R_1$ is 2-cyanoethoxymethyl, 2-cyano-1-alkylethoxymethyl, bis(2 - cyanoethyl)amino, or bis(2-cyano-1-alkylethyl)amino.

With reference to Formula I above, illustrative R radicals include, for example, the alkyls, e.g., methyl, ethyl, n-propyl, isopropyl, n-butyl, sec-butyl, t-butyl, isobutyl, n-hexyl, 2-ethylhexyl, dodecyl, octadecyl, and the like; the cycloalkyls, especially those which contain from 5 to 7 carbon atoms in the cycloaliphatic nucleus, e.g., cyclopentyl, cyclohexyl, cycloheptyl, alkylcyclopentyl, alkylcyclohexyl, alkylcycloheptyl, and the like; the aryls, e.g., phenyl, naphthyl, anthryl, biphenylyl, and the like; the aralkyls, e.g., benzyl, phenethyl, phenylbutyl, and the like; the alkaryls, e.g., tolyl, xylyl, ethylphenyl, octylphenyl, and the like; the alkenyls, e.g., vinyl, allyl, crotyl, 3-butenyl, 3-methylpropenyl, 2-ethylhexenyl, and the like; the cycloalkenyls, especially those which contain from 5 to 6 carbon atoms in the cycloaliphatic nucleus, e.g., cyclopentenyl, cyclohexenyl, lower alkyl substituted cyclohexenyl, and the like; the alkoxymethyls, preferably the lower alkoxymethyls, e.g., methoxymethyl, ethoxymethyl, propoxymethyl, n-butoxymethyl, t-butoxymethyl, isobutoxymethyl, 2 - ethylhexoxymethyl, decoxymethyl, and the like; the cycloalkoxymethyls, especially those which contain from 5 to 7 carbon atoms in the cycloaliphatic nucleus, e.g., cyclopentoxymethyl, cyclohexoxymethyl, cycloheptoxymethyl, lower alkyl substituted cyclohexoxymethyl, and the like; phenoxymethyl; benzyloxymethyl; naphthyloxymethyl; toloxymethyl; xyloxymethyl; ethylphenoxymethyl; the alkenyloxymethyls, e.g., vinyloxymethyl, allyloxymethyl, 3-butenyloxymethyl, 4-pentenyloxymethyl, 4-octenyloxymethyl, and the like; the cycloalkenyloxymethyls, especially those which contain from 5 to 6 carbon atoms in the cycloaliphatic nucleus, e.g., cyclopentenyloxymethyl, cyclohexenyloxymethyl, alkyl substituted cyclohexenyloxymethyl, and the like; the alkenylbenzyloxymethyls, e.g., vinylbenzyloxymethyl, allylbenzyloxymethyl, 4 - pentenylbenzyloxymethyl, and the like; the acyloxymethyls, e.g., propenoyloxymethyl, 2-butenoyloxymethyl, 3 - butenoyloxymethyl, 4-pentenoyloxymethyl, 4-octenoyloxymethyl, 3-phenylpropenoyloxymethyl, ethanoyloxymethyl, propanoyloxymethyl, butanoyloxymethyl, hexanoyloxymethyl, octanoyloxymethyl, benzoyloxymethyl, cinnamoyloxymethyl, phenylethanoyloxymethyl, cyclohexanecarbonyloxymethyl; cyclohexenecarbonyloxymethyl, 2,4-hexadienoyloxymethyl, linoleoyloxymethyl, oleoyloxymethyl, linolenoyloxymethyl, and the like; the dialkylaminos, preferably the lower dialkylaminos, e.g., dimethylamino, diethylamino, diisopropylamino, di - n-butylamino, di-sec-butylamino, di-t-butylamino, diisobutylamino, di - 2-ethylhexylamino, dioctadecylamino, and the like; the dicycloalkylaminos, especially those which contain from 5 to 6 carbon atoms in the cycloaliphatic nucleus, e.g., dicyclopentylamino, dicyclohexylamino, di(lower alkyl-substituted cyclohexyl) amino, and the like; diallylamino; dicrotylamino; and the like. It is pointed out at this time that the terms a "lower alkyl" radical or a "lower alkoxy" radical, as used herein, includes those radicals which contain from 1 to 6 carbon atoms therein. It is further preferred that the R radicals contain no more than 12 carbon atoms each.

The variable $R_1$ as well as R in Formula I supra can be a bis(2-cyanoethyl)amino radical as illustrated by the formula

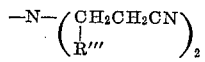

each R''' being hydrogen or alkyl, for instance, bis(2-cyanoethyl)amino, bis(2-cyano-1-methylethyl)amino, or a 2-cyanoethoxymethyl radical as illustrated by the formula

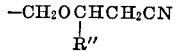

wherein R'' is hydrogen or alkyl, for instance, 2-cyanoethoxymethyl, 2-cyano-1-lower alkylethoxymethyl, 2-cyano-1-methylethoxymethyl, 2-cyano-1-ethylethoxymethyl, 2 - cyano - 1-isopropylethoxymethyl, 2-cyano-1-n-hexylethoxymethyl, 2 - cyano-1-dodecylethoxymethyl, and the like. It is preferred that R be nitro, alkyl, alkoxymethyl, alkenyloxymethyl, cyanoethoxymethyl, or a 2-cyano-1-lower alkylethoxymethyl radical, and that $R_1$ be 2-cyanoethoxymethyl or 2-cyano-1-lower alkylethoxymethyl. It is further preferred that the R variables contain no more than 6 carbon atoms each.

Exemplary classes of novel cyanoalkylated carbonate compounds include 4-nitro-4-(2-cyanoethoxymethyl or 2-cyano-1-lower alkylethoxymethyl)-2,6-dioxacyclohexanone, 4-dialkylamino-4-(2-cyanoethoxymethyl or 2-cyano-1-lower alkylethoxymethyl)-2,6-dioxacyclohexanone, 4-alkyl-4-(2-cyanoethoxymethyl or 2-cyano-1-lower alkylethoxymethyl)-2,6-dioxacyclohexane, 4-alkenyloxymethyl-4-(2-cyanoethoxymethyl or 2-cyano-1-lower alkylethoxymethyl)-2,6-dioxacyclohexanone, 4-alkoxymethyl-4-(2-cyanoethoxymethyl or 2-cyano-1-lower alkylethoxymethyl)-2,6-dioxacyclohexanone, 4-alkanoyloxymethyl-4-(2-cyanoethoxymethyl or 2-cyano-1-lower alkyl ethoxymethyl)-2,6-dioxacyclohexanone, 4-alkenoyloxymethyl-4-(2-cyanoethoxymethyl or 2-cyano-1-lower alkylethoxymethyl)-2,6-dioxacyclohexanone, 4,4-di(2-cyanoethoxymethyl)-2,6-dioxacyclohexanone,
4,4-di(2-cyano-1-alkylethoxymethyl)-2,6-dioxacyclohexanone,
4-[di(2-cyanoethyl)amino]-4-(2-cyanoethoxymethyl or 2-cyano-1-lower alkylethoxymethyl)-2,6-dioxacyclohexanone,
4-[di(2-cyano-1-lower alkylethyl)amino]-4-(2-cyanoethoxymethoxymethyl or 2-cyano-1-lower alkylethoxymethyl)-2,6-dioxacyclohexanone,
and the like.

Specific examples of the cyanoalkylated carbonate compounds include, for instance,
4-nitro-4-(2-cyanoethoxymethyl)-2,6-dioxacyclohexanone,
4-nitro-4-(2-cyano-1-methylethoxymethyl)-2,6-dioxacyclohexanone,
4-dimethylamino-4-(2-cyanoethoxymethyl)-2,6-dioxacyclohexanone,
4-diethylamino-4-(2-cyanoethoxymethyl)-2,6-dioxacyclohexanone,
4-diisopropylamino-4-(2-cyanoethoxymethyl)-2,6-dioxacyclohexanone,
4-nitro-4-(2-cyano-1-isopropylethoxymethyl)-2,6-dioxacyclohexanone,
4-diethylamino-4-(2-cyano-1-n-butylethoxymethyl)-2,6-dioxacyclohexanone,
4-methyl-4-(2-cyanoethoxymethyl)-2,6-dioxacyclohexanone,
4-ethyl-4-(2-cyanoethoxymethyl)-2,6-dioxacylohexanone,
4-ethyl-4-(2-cyano-1-methylethoxymethyl)-2,6-dioxacyclohexanone,
4-isopropyl-4-(2-cyanoethoxymethyl)-2,6-dioxacyclohexanone,
4-methyl-4-(2-cyano-1-methylethoxymethyl)-2,6-dioxacyclohexanone,
4-phenyl-4-(2-cyanoethoxymethyl)-2,6-dioxacyclohexanone,
4-methoxymethyl-4-(2-cyanoethoxymethyl)-2,6-dioxacyclohexanone,
4-ethoxymethyl-4-(2-cyanoethoxymethyl)-2,6-dioxacyclohexanone,
4-isopropoxymethyl-4-(2-cyanoethoxymethyl)-2,6-dioxacyclohexanone,
4-n-butoxymethyl-4-(2-cyanoethoxymethyl)2,6-dioxacyclohexanone,
4-allyloxy methyl-4-(2-cyanoethoxymethyl)-2,6-dioxacyclohexanone,
4-crotyloxymethyl-4-(2-cyanoethoxymethyl)2,6-dioxacyclohexanone,
4-(3-butenyloxymethyl)-4-(2-cyanoethoxymethyl)-2,6-dioxacyclohexanone,
4-acetoxymethyl-4-(2-cyanoethoxymethyl)-2,6-dioxacyclohexanone,
4-propanoyloxymethyl-4-(2-cyanoethoxymethyl)-2,6-dioxacyclohexanone,
4-propenoyloxymethyl-4-(2-cyanoethoxymethyl)-2,6-dioxacyclohexanone,
4-(2-butenoyloxymethyl)-4-(2-cyanoethoxymethyl)-2,6-dioxacyclohexanone,
4-[di(2-cyanomethyl)amino]-4-(2-cyanoethoxymethyl)-2,6-dioxacyclohexanone,
4,4-di(2-cyanoethoxymethyl)-2,6-dioxacyclohexanone,
4,4-di(2-cyano-1-methylethoxymethyl)-2,6-dioxacyclohexanone,
4,4-di(2-cyano-1-ethylethoxymethyl)-2,6-dioxacyclohexanone,
and the like.

The preparation of 4-nitro-4-(2-cyanoethoxymethyl)-2,6-dioxacyclohexanone or 4-nitro-4-(2-cyano-1-alkylethoxymethyl)-2,6-dioxacyclohexanone is effected by the following sequence of steps:

(1)
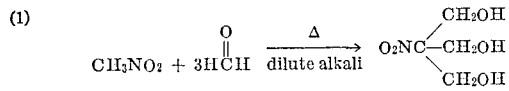

Equation 1 supra represents an aldol-like condensation reaction which can be conducted in the presence of a basic catalyst, e.g., a dilute alkali metal hydroxide solution, at a moderately elevated temperature. The product, i.e., tris(hydroxymethyl)nitromethane, is then contacted with an alpha,beta-ethylenically unsaturated nitrile, e.g., 2-alkenenitrile (which is designated as RCN in Equation 2 below), in the presence of a basic catalyst, e.g., quaternary ammonium hydroxides such as tetramethyl ammonium hydroxide, tribenzylmethyl ammonium hydroxide, etc., at a temperature of from about 20° to about 90° C., preferably from about 20° to about 50° C., that is:

(2)
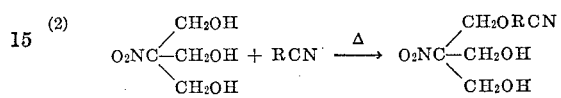

The resulting cyanoalkylated product then can be reacted with phosgene, preferably in the presence of, for example, an alkali metal hydroxide, alkaline earth metal hydroxide, or a tertiary amine such as triethylamine, pyridine, etc., at a temperature of from about 0° C. to about 50° C., and higher, to produce the nitro substituted carbonate compound. Alternatively, the product of Equation 2 can be reacted with the dialkyl carbonates $$(RO\overset{O}{\underset{\|}{C}}OR)$$

e.g., diethyl carbonate, etc., or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals; the titanates having the general formulae $Y_2TiO_3$ and $Y_4TiO_4$ in which the Y's are alkyl, aryl, or aralkyl radicals. The tin compounds, the organic salts of lead, and the organic salts of manganese which are described in U.S. 2,890,208 as well as the metal chelates and metal acylates disclosed in U.S. 2,878,236 can be employed as exemplified transesterification catalysts. Equation 3 infra illustrates the cyclization step whereby the nitro substituted carbonate compound is formed.

(3)
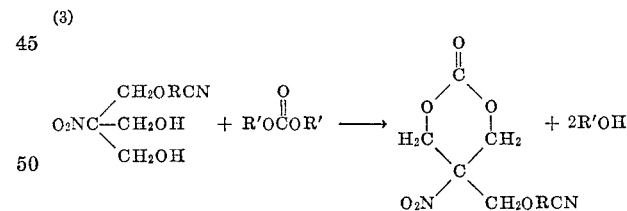

The R radical in Equation 3 above is a divalent aliphatic hydrocarbon radical, e.g., alkylene.

The preparation of 4-tertiary amino-4-(2-cyanoethoxymethyl)-2,6-dioxacyclohexanone or 4-tertiary amino-4-(2-cyano-1-alkylethoxymethyl)-2,6-dioxacyclohexanone can be accomplished by contacting the tris(hydroxymethyl)nitromethane product of Equation 1 supra with hydrogen, in the presence of conventional hydrogenation catalysts, e.g., Raney nickel, platinum, and the like, at an elevated temperature, followed by alkylation of the resulting primary amino group (—NH₂) with, for example, a stoichiometric quantity of a hydrocarbyl halide, preferably in the presence of a base, e.g., an alkali metal hydroxide, to thus convert said —NH₂ group to a tertiary amino group, i.e.,

The bis(2-cyanoethyl or 2-cyano-1-methylethyl)amino carbonates are prepared by the cyanoethylation of said —NH₂ group with a 2-alkenenitrile as set out in Equation 2 above. Equation 4 below discloses the series of reactions involved.

(4) 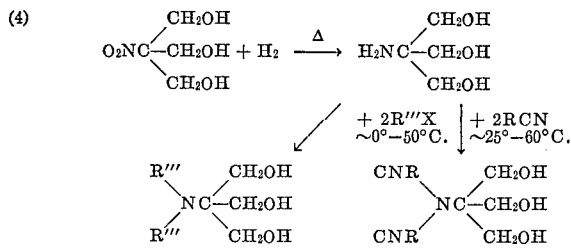

Either tertiary amino tris(hydroxymethyl)methane product then can be monocyanoalkylated as shown in Equation 2 above, followed by cyclizing same to the corresponding carbonate, i.e., a 4-tertiary amino-4-(2-cyanoethoxymethyl)-2,6-dioxacyclohexanone, by following the procedure shown in Equation 3 supra.

The preparation of 4-hydrocarbyl-4-(2-cyanoethoxymethyl or 2-cyano-1-alkylethoxymethyl)-2,6-dioxacyclohexanones are conveniently prepared by the reaction of the appropriate aldehyde which contains two alpha hydrogen atoms, e.g., R'CH$_2$CHO wherein R' is hydrocarbyl such as alkyl, aryl, cycloalkyl, aralkyl, alkaryl, alkenyl, cycloalkenyl, etc., with an excess of formadehyde, as shown in the following equation:

(5) 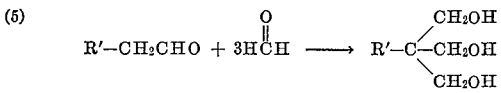

The resulting 1-hydrocarbyl-1,1,1-trimethylolmethane then can be reacted with RCN of Equation 2 supra, followed by the cyclization step of Equation 3 to obtain the cyclic carbonates under consideration.

The 4-acyloxymethyl-4-(2-cyanoethoxymethyl)-2,6-dioxacyclohexanones, 4-acyloxymethyl-4-(2-cyano-1-alkylethoxymethyl)-2,6-dioxacyclohexanones, 4 - hydrocarbyloxymethyl - 4 - (2 - cyanoethoxymethyl)-2,6-dioxyacyclohexanones, and 4-hydrocarbyloxymethyl-4-(2-cyano-1-alkylethoxymethyl)-2,6-dioxacyclohexanones are prepared by the reaction of a large excess pentaerylthritol with relation to R"X (acyl chloride or hydrocarbyl chloride) to produce the monoester or the monoether of pentaerythritol which, in turn, can be reacted with deficient RCN (note Equation 2 supra) to prepare the monocyanoalkylated monoether or monoester products. The aforesaid products then can be cyclized as taught in Equation 3 above.

The reaction of, for example, two mols of RCN with one mol of pentaerythritol yields the 1,1-bis(cyanoethoxymethyl)-1,1-bis(hydroxymethyl)methane which can be cyclized according to Equation 3 above to produce the 4,4-bis(2-cyanoethoxymethyl)-2,6-dioxacyclohexanones.

The preparation of 4-(hydrocarbyloxymethyl or acyloxymethyl)-4-bis(2-cyanoethyl or 2-cyano-1-alkylethyl) amino-2,6-dioxacyclohexanones are effected by reacting a large excess of the 1-(2-cyanoethylamino)-1,1,1-tris(hydroxymethyl)methane product of Equation 4 with an acyl halide or hydrocarbyl halide to produce the monoester or the monoether, respectively, which in turn can be cyclized as described in Equation 3 supra.

The novel ethylenically unsaturated cyclic carbonates of Formula I can be homopolymerized through the ethylenic group, or these novel carbonates can be copolymerized with other ethylenically unsaturated carbonate(s) or with other ethylenically unsaturated organic compound(s) (described hereinafter and termed "vinyl monomer," for brevity) through their ethylenic groups, preferably in the presence of a peroxide catalyst (described hereinafter), to give linear solid polymeric products which have utility in the molding, laminating, and coating arts, e.g., manufacture of plastic toys which can be rigid or flexible, paperweights, inkstands, etc.

Among the vinyl monomers which are contemplated are those which contain a polymerizable ethylenic bond.

Illustrative vinyl monomers include, for example, styrene, alkylstyrene, chlorostyrene, ethylstyrene, dimethylstyrene, isopropylstyrene, divinylbenzene, alkyl acrylate, alkyl methacrylate, alkyl crotonate, methyl acrylate, ethyl acrylate, n-propyl acrylate, n-butyl acrylate, methyl methacrylate, ethyl methacrylate, isopropyl methacrylate, n-amyl methacrylate, methyl crotonate, ethyl crotonate, n-propyl crotonate, t-butyl crotonate, 2-ethylhexyl crotonate, vinyl acetate, vinyl propionate, vinyl butyrate, vinyl valerate, and the like. Additional desirable monomeric ethylenically unsaturated compounds include, for instance, triallyl cyanurate, diallyl phthalate, triallylamine, acrylonitrile, allyl acrylate, allyl methacrylate, allyl crotonate, allyl butyrate, allyl 2-ethylhexanoate, allyl benzoate, and the like.

The peroxide catalysts which can be employed include, for instance, benzoyl peroxide, methyl ethyl ketone peroxide, methyl isobutyl ketone peroxide, p-menthane hydroperoxide, t-butyl hydroperoxide, cumene hydroperoxide, acetyl peroxide, cyclohexanone peroxide, lauroyl peroxide, di-t-butyl peroxide, t-butyl perbenzoate, and the like.

The operative conditions, e.g., temperature and pressure, are of the order employed in the vinyl-type polymerization arts, e.g., 75°–150° C.

The novel saturated as well as the ethylenically unsaturated cyclic carbonates of Formula I can be homopolymerized or copolymerized through the carbonate group, in the presence of catalysts such as n-butyllithium, di-n-butylzinc, and triisobutylaluminum, at a temperature of from about 0° to about 200° C., and for a period of time sufficient to produce high molecular weight solid products. The solid products which lack ethylenic unsaturation can be used in the moldings and laminating arts, for the manufacture of toys, paperweights, skis, and the like. The solid products which contain a plurality of pendant groups having ethylenic sites can be cured via procedures well recognized in the synthetic and natural rubber arts, e.g., sulfur cure, to give tough and/or rubbery and/or elastomeric products. These products are useful as gaskets, seals, flexible films, specialty tires, and the like.

The novel cyclic carbonate compounds of Formula I supra which contain ethylenic unsaturation can be contacted with an organic peracid to produce the corresponding vicinal-epoxide(s). Among the peracids contemplated include, for example the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight per cent of peracid, based on the total weight of peracid and inert organic vehicle is suitable; from about 20 to 40 weight percent of the peracid is preferred. The epoxidation reaction can be conducted at a temperature in the range of from about 0° C., and lower, to about 100° C., and higher, and preferably from about 20° C. to about 80° C. The ultimate epoxide product will depend upon the number of ethylenic bonds present in the cyclic carbonate reactant and the amount of peracid employed. Thus, substantial conversion of a monoethylenically unsaturated cyclic carbonate compound to the corresponding vicinal-epoxy cyclic carbonate compound is favored or accomplished by employing at least one mol of peracid per mol of said monoethylenically unsaturated cyclic carbonate, e.g., from about 1.0 to about 10 mols of peracid per mol of said carbonate. By way of a second illustration, if the cyclic carbonate contains two carbon to carbon double bonds, then substantial diepoxidation occurs by employing at least two mols of peracid per mol of diethylenically unsaturated cyclic carbonate. In general, then, the number of mols of peracid per mol of carbonate reactant which should be employed to effect essentially complete epoxidation is at least equal to, and generally greater than, the number of ethylenic sites contained in said carbonate reactant. When a polyethylenically unsaturated cyclic carbonate reactant is employed, one can also obtain a cyclic carbonate product which contains an ethylenic group(s) as well as a vicinal-epoxy(s) by employing, for example, equimolar quantities of the carbonate and peracid reactants, and more desirable still, by employing a molar excess of the carbonate reactant in relation to the peracid. In general, the epoxidation reaction is conducted for a period of time which is sufficient to introduce oxirane oxygen at the desired number of ethylenic sites in the carbonate reactant. Oftentimes, this reaction period is usually sufficient to essentially consume the quantity of peracid employed. Periodic analysis of samples of the reaction mixture to determine the quantity of peracid consumed during the epoxidation reaction can be readily performed by the operator by well-known techniques. At the termination of the epoxidation reaction, the unreacted ethylenically unsaturated carbonate precursor, acid by-product, inert vehicle, if employed, and the like, can be recovered from the reaction product mixture, for example, by distillation under reduced pressure. Further well-known procedures such as fractional distillation, and the like, can be used to purify the vicinal-epoxy cyclic carbonate product.

The vicinal-epoxy cyclic carbonate compounds are novel and useful. They can be characterized by the following formula:

II
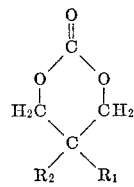

wherein $R_1$ of Formula II above has the same values as the variable $R_1$ of Formula I supra, and wherein $R_2$ is equal to the partially or completely epoxidized moieties of R of Formula I supra, for example, vicinal-epoxyalkoxymethyl, vicinal-epoxyalkenyloxymethyl, di(vicinal-epoxy)alkoxymethyl, vicinal-epoxy alkylbenzyloxymethyl, vicinal-epoxycycloalkoxymethyl, and the like. The $R_2$ variables of Formula II supra are fully illustrated by merely substituting oxirane oxygen for one of the bonds in the carbon to carbon ethylenic unsaturation, i.e., converting

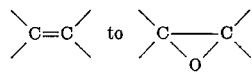

of the R variables of Formula I supra.

The vicinal-epoxy cyclic carbonate compounds of Formula II can be homopolymerized, or these novel vicinal-epoxy cyclic carbonates can be copolymerized with other vicinal-epoxy cyclic carbonates or with other mono- or polyepoxides, preferably in the presence of an epoxy polymerization catalyst such as the metal halide Lewis acids, e.g., boron trifluoride, under typical epoxy polymerization conditions, to give solid polymeric products which are useful as paperweights, in the manufacture of toys, etc.

Among the mono- and polyepoxides which are contemplated include, among others, 4-vinylcyclohexene dioxide, dicyclopentadiene dioxide, divinylbenzene dioxide, 3,4-epoxy-6-methylcyclohexylmethyl 3,4-epoxy-6-methylcyclohexanecarboxylate, diethylene glycol bis(3,4-epoxycyclohexanecarboxylate), bis(2,3-epoxycyclopentyl) ether, butadiene dioxide, phenyl gylcidyl ether, 1,2-epoxydodecane, and the like.

In addition, the novel vicinal-epoxy cyclic carbonates of Formula II with or without a polyepoxide such as those illustrated previously, can be reacted with an active organic hardener such as polycarboxylic acids, polycarboxylic acid anhydrides, polyfunctional amines, polyols polythiols, polyisocyanates, polyacyl halides, and the like, preferably in the presence of a typical epoxy polymerization catalyst, $BF_3$-etherate, under conventional curing conditions, to produce solid epoxy resins which are useful in the laminating, coating, molding, and encapsulating arts.

The vicinal-epoxy cyclic carbonates of Formula II are also useful as plasticizers for polyvinyl chloride compositions.

The following examples are illustrative.

EXAMPLE 1

(A) Into a 5-liter three-neck flask are charged two mols of 1-nitroethane and 0.5 gram of calcium oxide. Three hundred and twenty four grams of 37.5 percent formalin solution (4 mols of formaldehyde) are added dropwise to the well-agitated reactant mixture. During formaldehyde addition the exotherm is removed by cooling with water, and the reaction temperature is not allowed to exceed 30° C. After about one half of the Formalin solution is added the reactant mixture becomes a single phase. After Formalin addition is complete the reactants are allowed to stand at room temperature for 48 hours. The calcium catalyst is now removed by percolation through a column of Amberlite IRC-50 ion-exchange resin. The column effluent is evaporated to dryness at 90° C. in vacuo. The resulting 2-nitro-2-methyl-1,3-propanediol is a solid melting at 149–150° C. after recrystallization from water.

(B) One mol of 2-methyl-2-nitro-1,3-propanediol is dissolved in 500 milliliters of alcohol and charged to a 3-liter hydrogenation rocker-bomb. Five grams of Raney-nickel is added to the bomb, the reactants are heated to 90° C. and 100 p.s.i. of hydrogen pressure is applied while the bomb is agitated. After hydrogen uptake ceases, the bomb is cooled to room temperature, the product is discharged, and the catalyst is removed by filtration. Volatiles like solvent and water are removed by distillation in vacuo. The resulting 2-amino-2-methyl-1,3-propanediol after further purification by recrystallization from water melts at 108–109° C.

(C) To a reaction flask equipped with stirrer, thermometer, and reflux condenser, there are charged one mol of 2-amino-2-methyl-1,3-propanediol, 200 milliliters of water, and 2 grams of Triton B catalyst (tribenzylmethylammonium hydroxide). Two mols of acrylonitrile is added at 40–50° C. while agitating the reactants vigorously. After all the acrylonitrile has been added, the reactant mixture is agitated for an additional two hours. The water is then removed in vacuo. The product, 2-bis(2-cyanoethyl)amino-2-methyl-1,3-propanediol, is purified by distillation at 0.5 mm. Hg. Examination of the infrared spectrum, analysis for the hydroxyl group, and elemental analysis is consistent with the molecular structure of the subject compound.

(D) One half mol of 2-bis(2-cyanoethyl)amino-2-methyl-1,3-propanediol, 0.75 mol of diethyl carbonate, and 0.5 gram of sodium are charged to a 4-neck flask equipped with stirrer, thermometer, and distillation column. The reactant mixture is heated to about 140° C., and over a period of 3 hours the resulting ethanol coproduct is removed via distillation. The reactant mixture is then subjected to a vacuum to remove remaining alcohol and excess diethyl carbonate. The pot temperature is increased to 150–160° C. while the resulting cyclic carbonate is removed via distillation at a pressure of 1–3 mm. Hg. Further purification by distillation at 0.3 mm.

Hg results in the subject compound, namely, 4-bis(2-cyanoethyl)amino - 4 - methyl - 2,6 - dioxacyclohexanone. Examination of the product by means of infrared, analysis for the carbonate group, and elemental analysis is consistent with the molecular structure of the subject compound.

EXAMPLE 2

(A) To a reaction flask equipped with stirrer, thermometer, and reflux condenser, there are charged 2 mols of tris(hydroxymethyl)nitromethane, 300 milliliters of water, and 3 grams of Triton B catalyst. Two mols of acrylonitrile is added at 40–50° C. while agitating the reactants vigorously. After the addition of acrylonitrile is complete, the reactant mixture is agitated for an additional 3 hours. The product mixture is then diluted with 500 milliliters of isopropanol and percolated over a column of Amberlite 200 to remove the base catalyst. The column effluent is evaporated in vacuo to remove isopropanol and water. The desired product, 2-(2-cyanoethoxymethyl)-2-nitro-1,3-propanediol, is purified by distillation at 0.3–0.5 mm. Hg. Examination of the infrared spectrum, analysis for the hydroxyl group, and elemental analysis is consistent with the molecular structure of the subject compound.

(B) To a reaction flask equipped with stirrer, thermometer, and Dry Ice condenser, there are charged 0.5 mol of 2-(2-cyanoethoxymethyl)-2-nitro-1,3-propanediol, one mol of triethylamine, and 750 milliliters of toluene. The reactants are cooled to 0–5° C. One-half mol of phosgene is then added gradually to the reaction flask at a temperature not exceeding 15° C. After completion of the phosgene addition, the mixture is allowed to warm to room temperature. The amine hydrochloride is removed by filtration and the toluene filtrate is set aside. A substantial amount of the carbonate remains in the hydrochloride and is recovered by extraction with acetone. The toluene solution and the acetone extract are combined and the solvents are removed in vacuo. The resulting syrup is the crude carbonate. It is purified by rapid distillation at 150–170° C. at a pressure of 1–3 mm. Hg. Further purification by distillation at 0.3 mm. Hg results in the product, namely, 4-nitro-4-(2-cyanoethoxymethyl)-2,6-dioxacyclohexanone. Examination of the infrared spectrum, analysis for the carbonate group, and elemental analysis are consistent with the molecular structure of the subject carbonate.

EXAMPLE 3

(A) To a reaction flask equipped with stirrer, thermometer, and reflux condenser, there are charged 2 mols of trimethylolpropane, 300 milliliters of water, and 3 grams of Triton B catalyst. Two mols of acrylonitrile is added at 40–50° C. while agitating the reactants vigorously. After the addition of acrylonitrile is complete, the reactant mixture is agitated for an additional 3 hours. The product mixture is the diluted with 500 milliliters of isopropanol and percolated over a column of Amberlite 200 to remove the base catalyst. The column effluent is evaporated in vacuo to remove isopropanol and water. The desired product, 2-(2-cyanoethoxymethyl)-2-ethyl-1,3-propanediol, is purified by distillation at 0.3–0.4 mm. Hg. Examination of the infrared spectrum, analysis for the hydroxyl group, and elemental analysis is consistent with the molecular structure of the subject compound.

(B) To a flask equipped with stirrer, thermometer, and distillation column, there are charged 0.5 mol of 2-(2-cyanoethoxymethyl)-2-ethyl-1,3-propanediol, 0.75 mol of diethyl carbonate, and 0.3 gram of sodium. The reactant mixture is heated to about 140° C., and over a period of one hour, the resulting ethanol co-product is removed via distillation. After removal of excess diethyl carbonate in vacuo, the pot temperature is increased to 160° C., and the resulting cyclic carbonate is recovered by distillation at about 0.5 mm. Hg. Further rectification by distillation at about 10⁻³ mm. Hg results in the subject carbonate, namely, 4-(2-cyanoethoxymethyl)-4-ethyl-2,6-dioxacyclohexanone. Examination of the subject carbonate by means of infrared analysis, and by elemental analysis is consistent with its structure.

EXAMPLE 4

(A) To a reaction flask equipped with stirrer, thermometer, and reflux condenser, there are charged one mol of pentaerythritol, 300 milliliters of water, and 3 grams of Triton B catalyst. Two mols of acrylonitrile is added at 40–50° C. while agitating the reactants vigorously. After the addition of acrylonitrile is complete, the reactant mixture is agitated for an additional 3 hours. The product mixture is then diluted with 500 milliliters of isopropanol and percolated over a column of Amberlite 200 to remove the base catalyst. The column effluent is evaporated in vacuo to remove isopropanol and water. The desired product, 2,2'-di(2-cyanoethoxymethyl)-1,3-propanediol, is purified by distillation at mm. Hg. Examination of the infrared spectrum, analysis for the hydroxyl group, and elemental analysis is consistent with the molecular structure of the subject compound.

(B) To a flask equipped with stirrer, thermometer, and distillation column, there are charged 0.5 mol of 2,2'-di(2-cyanoethyloxymethyl)-1,3-propanediol, 0.75 mol of diethyl carbonate, and 0.3 gram of sodium. The reactant mixture is heated to about 140° C., and over a period of 2 hours the resulting ethanol co-product is removed via distillation. After removal of excess diethyl carbonate in vacuo, the pot temperature is increased to 150–170° C., and the resulting cyclic carbonate is recovered by distillation at 0.5–1.5 mm. Hg. Further purification by distillation at 1 mm. Hg results in the subject carbonate, namely, 4,4' - di(2 - cyanoethyloxymethyl) - 2,6 - dioxacyclohexanone. Examination of the subject compound by means of infrared analysis, and elemental analysis is consistent with its structure.

What is claimed is:
1. A compound of the formula

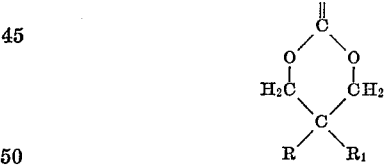

wherein R is of the group consisting of alkyl, alkoxymethyl, alkenyloxymethyl, alkanoyloxymethyl, alkenoyloxymethyl, nitro, 2-cyanoethoxymethyl, 2-cyano-1-alkylethoxymethyl, and the unit

each R' being of the group consisting of 2-cyanoethyl, 2-cyano-1-alkylethyl, and alkyl; wherein $R_1$ is of the group consisting of 2-cyanoethoxymethyl, 2-cyano-1-alkylethoxymethyl, bis(2-cyanoethyl)amino, and bis(2-cyano-1-alkylethyl)amino.

2. 4-alkyl-4-bis(2-cyanoethyl)amino - 2,6 - dioxacyclohexanone.

3. 4-alkyl-4-(2-cyanoethoxymethyl) - 2,6 - dioxacyclohexanone.

4. 4-alkoxymethyl - 4 - (2-cyanoethoxymethyl)-2,6-dioxacyclohexanone.

5. 4-alkoxymethyl-4-bis(2-cyanoethyl)amino-2,6-dioxacyclohexanone.

6. 4,4-bis(2-cyanoethoxymethyl)-2,6-dioxacyclohexanone.

7. 4-nitro-4-(2-cyanoethoxymethyl)-2,6-dioxacyclohexanone.

8. 4-bis(2-cyanoethyl)amino-4-(2-cyanoethoxymethyl)-2,6-dioxacyclohexanone.

References Cited

UNITED STATES PATENTS 2,924,607  2/1960  Pattison _____ 260—340.2 X

N. S. MILESTONE, *Primary Examiner.*

U.S. Cl. X.R.

260—77.5, 465.5, 465.6, 584